No. 690,525. Patented Jan. 7, 1902.
W. C. MARSHALL.
RENDERING TANK.
(Application filed June 10, 1901.)
(No Model.) 2 Sheets—Sheet 1.

Witnesses:
J. H. Glendening
G. A. Pauberschmidt

Inventor:
William C. Marshall
by Brown and Darby
Attorneys

THE NORRIS PETERS CO., PHOTO-LITHO., WASHINGTON, D. C.

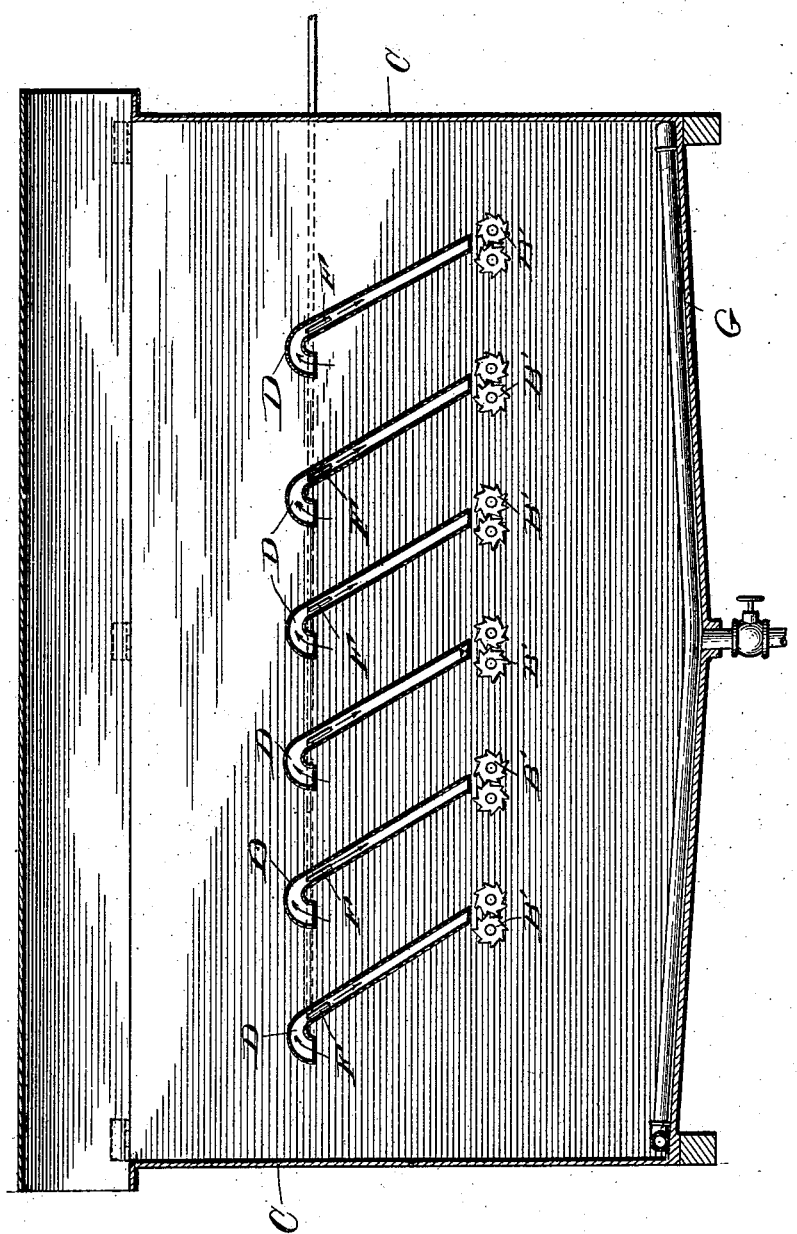

UNITED STATES PATENT OFFICE.

WILLIAM C. MARSHALL, OF CHICAGO, ILLINOIS.

RENDERING-TANK.

SPECIFICATION forming part of Letters Patent No. 690,525, dated January 7, 1902.

Application filed June 10, 1901. Serial No. 63,846. (No model.)

*To all whom it may concern:*

Be it known that I, WILLIAM C. MARSHALL, a citizen of the United States, residing at Chicago, in the county of Cook and State of Illinois, have invented a new and useful Improvement in Rendering-Tanks for Rendering Lard and Similar Uses, of which the following is a specification.

This invention relates to an improvement in rendering-tanks for rendering lard and similar uses.

The invention consists substantially in the construction hereinafter set forth, and more particularly pointed out in the claims.

In the several figures of the drawings like reference-letters designate similar parts.

Figure 1:
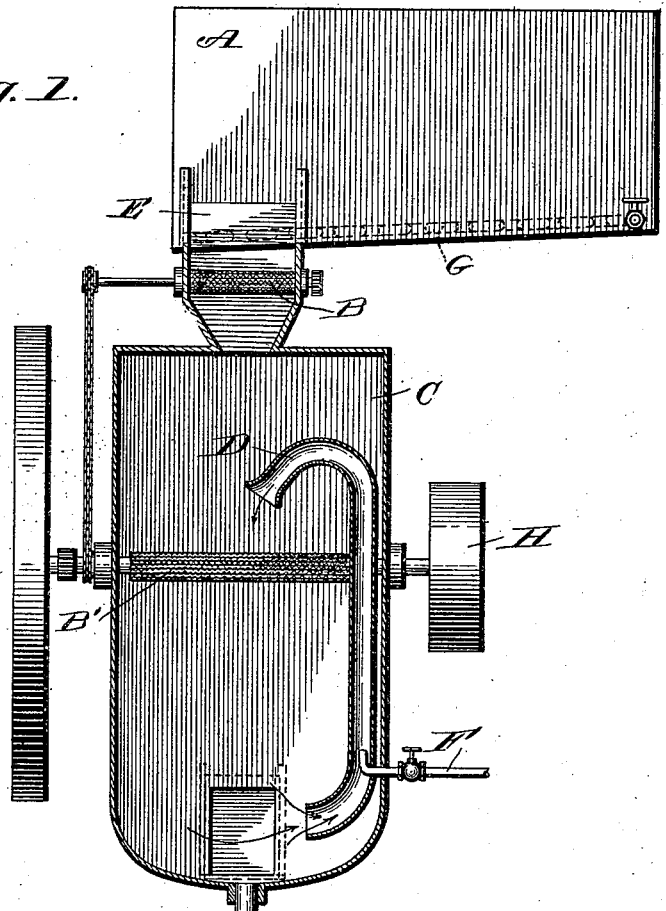
Figure 2:
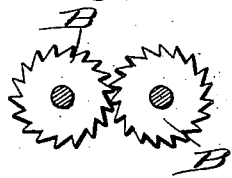
Figure 3:
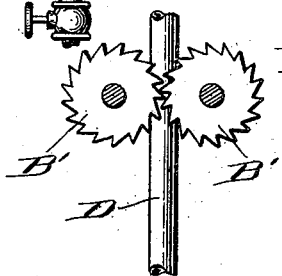

Figure 1 is a vertical section of the apparatus. Fig. 2 is an end view of the upper pair of crushing-rolls. Fig. 3 is a cross-section of the lower pair of crushing-rolls, showing in elevation a part of the steam-siphon.

There are two methods of rendering lard in ordinary use, which are respectively designated in the trade as "kettle-rendering" and "steam-rendering," and the products of which are commercially named as "kettle-rendered" lard and "steam-rendered" lard. Steam-rendered lard is generally regarded as inferior to kettle-rendered lard and brings a lower price in the market, and the reasons for this are that there is a peculiar flavor given to the lard by the process of making it which is not regarded palatable, and the gelatinous products of the animal fats are for any purpose except that of converting them into fertilizers effectually destroyed, and this latter objection is worthy of serious consideration, since one thousand hogs will yield an average of from one to two tons of fertilizers composed of the gelatinous substances which, if uninjured by the process, are worth for other purposes eight or ten times as much as the same weight of the material when used and sold as a fertilizer.

The ordinary process of steam-rendering is as follows: The rough fat—that is to say, fat intermingled with bone and skin and a certain proportion of lean flesh which it is impracticable to remove—is cast into a vessel made steam-tight and then subjected to steam at a pressure varying from thirty pounds to forty pounds per square inch, or, say, a temperature of from 275° Fahrenheit to 285° Fahrenheit for a period averaging about eight hours. At the end of this time the steam is shut off and the tank is allowed to cool down and the lard is drawn off in its finished state. This crude method requires the consumption of considerable fuel, the building of quite a large plant which occupies valuable space, and while it effectually separates the fats from the substances joined with them it materially injures the gelatinous portions of such substances, so as to, as above indicated, unfit them for any other use except fertilizing purposes, and gives an unpleasant flavor to the lard product. On the 8th of April, 1873, I obtained Patent No. 137,698 for a process of rendering lard, which consists in first cooking raw lard, then passing it through a crushing or cutting apparatus into a rendering-tank, and then again cooking this crushed material and extracting the lard. This patented process was advantageous over the usual method in that it was much more economical, for the crushing of the substances enabled the heat to be more uniformly applied to each particle, and thus caused the steam to do its work more quickly; but nevertheless the character of the product remained the same, for it was still properly classified as "steam-rendered" lard and contained the unpleasant flavor and other disadvantages incident to lard manufactured in that manner. The present invention is an improvement on this patented invention and will now be described.

A suitable preliminary tank may be used like that employed in the patented process and in the drawings is designated by the letter A. It contains a series of coils of steam-pipe, (lettered G,) and the bottom is inclined toward the exit-gate E. The raw material may be cooked in this preparing-tank and then discharged through the gate upon a pair of crushing-rollers B, which tear them into pieces and deliver them into the rendering-tank C. Thus far the apparatus and operation do not differ materially from the patent above referred to; but the improvement resides in the construction and operation in the new rendering-tank. Instead of hermetically closing the rendering-tank such tank has an opening at the top at the point at which the meats are fed into the tank from the preparing-tank, and the steam which is introduced and primarily has a high pressure, so that it may act as a forcing agent, immediately it has done this work loses its pressure, because of the tank being open; but its heating effect is then brought into play and serves to thoroughly heat the fine particles which have been crushed in the tank by the crushing-rollers. In fact, the steam very soon becomes water, and the material being acted upon is therefore really subjected to the heating effect of boiling water, with the result that the quality of the lard produced is much improved, because it does not acquire the taint of flavor which constant contact with steam under pressure would give, and, moreover, the gelatinous products thus treated remain uninjured and may be put to their natural and most profitable uses. An apparatus by means of which this operation can be carried into effect will now be described.

The rendering-tank C is provided with a pipe D, which extends from near the lower part thereof to the point above a pair of crushing-rollers B', which rollers are geared together and driven by a pulley H, connected to any suitable source of power. Projecting from the outside of the rendering-tank through the wall of the same and into the tube D is the steam-pipe F, which is connected to a suitable steam-supply having a temperature of about 275° Fahrenheit and the inner end of which is bent in the direction in which the material is to be carried. It is obvious that with the construction shown in the drawings the crushed meats will be drawn into the tube D, and by the pressure of the steam forced upward through such tube and delivered upon the rollers B B', which are so constructed as to comminute or finely divide the material, and thereby enable its particles to be more perfectly reached by the heat from the steam, thus permitting it to be thoroughly rendered of the lard at a comparatively low temperature. With such an apparatus the time of the process is reduced to its minimum, and it has been found that the rendering of a tank of fat may be completed, excluding stops for drawing off lard from time to time, in about one hundred and thirty-five minutes as against four hundred and eighty minutes formerly required, and, moreover, the gelatinous substances are not injured, and the flavor of the lard produced is very much superior to ordinary steam-rendered lard. Moreover, it will be seen that steam under high pressure is not a requisite to this operation; but as soon as the operation of rendering is complete the contents of the tank may be discharged into a settling-tank, and the preparing-tank and rendering-tank may be immediately recharged and the operation continued, so that this one set of tanks being more frequently brought into operation will do the work of several sets of tanks under the old process, besides saving fuel, labor, space, and expense of plant.

It is obvious that various modifications may be made in the details of construction without departing from the principle of the invention. For instance, in Fig. 4 of the drawings is shown a modified form of tank, which is provided with rolls at the bottom instead of near the top and with the steam-siphon reversed—that is, leading toward the bottom instead of toward the top. With this construction the light particles as well as the heavier substances will be carried from the surface to the rollers at the bottom. The tank is preferably of large size—say about forty-five feet long, seven feet wide, and six feet in height—having a capacity of eighteen hundred and ninety cubic feet, which is about five times the size of an ordinary rendering-tank, and may have a series of siphons and rollers arranged as indicated, and with the construction herein described while the preparing-tank may be used as before it is not an absolute necessity, but the rendering-tank may be employed to perform the whole operation.

Other modifications will readily suggest themselves to those skilled in the art and need not be herein especially described.

What I claim, and desire to secure by Letters Patent, is—

1. In a rendering-tank, the combination with crushing-rolls, and impelling means for carrying the meat from a point below the rolls and delivering the same to said rolls; substantially as and for the purpose set forth.

2. In a rendering-tank, the combination with crushing-rolls, of guiding means leading to the rolls from a point below the latter and impelling means for forcing the meat through the guide to the rolls; substantially as and for the purpose set forth.

3. In a rendering-tank, the combination with crushing-rolls within the tank, of a guide-pipe in such tank discharging upon the crushing-rolls from a point below the same, and means for forcing the meat through such guide-pipe; substantially as and for the purpose set forth.

4. In a rendering-tank, the combination with the crushing-rolls, of a guide-pipe discharging upon the rolls, and a steam-pipe opening into the guide-pipe; substantially as and for the purpose set forth.

5. In a rendering-tank, the combination with crushing-rolls arranged within the tank at some distance from the bottom thereof, of a guide-pipe having an inlet-opening below such rolls and a discharge-opening above such rolls, and impelling means for forcing the material through the guide-pipe to the rolls; substantially as and for the purpose set forth.

6. In a rendering-tank, the combination with the crushing-rolls within the tank and arranged at some distance from the bottom thereof, of a guide-pipe having its inlet-opening above such rolls and a steam-pipe entering the guide-pipe and serving to force the material through the pipe upon such rolls; substantially as and for the purpose set forth.

7. In a rendering-tank, the combination with the crushing-rolls arranged at some distance above the bottom of the tank, of a guide-pipe having its inlet-opening near the bottom of said tank and extending upwardly above the crushing-rolls with a bent discharge end above the crushing-rolls, and a steam-pipe entering the guide-pipe and projecting in an upward direction; substantially as and for the purpose set forth.

8. In a rendering-tank, the combination with crushing-rolls and means for guiding the material to such rolls, of a single steam-pipe entering the tank and serving to force the material along the guiding means through the rolls and supply heat to the particles of material after being crushed so as to render the same; substantially as and for the purpose set forth.

In witness whereof I have hereunto set my hand, this 6th day of June, 1901, in the presence of the subscribing witnesses.

WILLIAM C. MARSHALL.

Witnesses:
 E. C. SEMPLE,
 CHAS. H. SEEM.